United States Patent [19]

Månsson

[11] Patent Number: 5,085,396
[45] Date of Patent: Feb. 4, 1992

[54] BED STRUCTURE FOR SUPPORTING ENGINES AND AUXILIARY UNITS

[75] Inventor: Kjell Månsson, Floda, Sweden

[73] Assignee: AB Volvo Penta, Gothenburg, Sweden

[21] Appl. No.: 159,419

[22] Filed: Feb. 4, 1988

[30] Foreign Application Priority Data

Feb. 9, 1987 [SE] Sweden .................. 8700482

[51] Int. Cl.⁵ .............................. F16M 3/00
[52] U.S. Cl. .................... 248/678; 248/676; 254/134
[58] Field of Search ............ 248/678, 639, 645, 670, 248/676, 637, 346; 269/17; 254/134

[56] References Cited

U.S. PATENT DOCUMENTS

| 2,204,877 | 6/1940 | Anderson . | |
| 2,592,845 | 4/1952 | Aron | 254/134 X |
| 3,391,445 | 7/1968 | Miller | 228/165 X |
| 3,446,366 | 5/1969 | Miller | 269/17 X |
| 3,891,345 | 6/1975 | Doolin | 248/678 X |
| 4,123,038 | 10/1978 | Meyers | 254/134 X |
| 4,191,356 | 3/1980 | Ashmun et al. | 248/678 |
| 4,336,677 | 6/1982 | Ossbahr | 248/678 X |
| 4,511,112 | 4/1985 | Ruehle | 248/678 X |
| 4,572,474 | 2/1986 | Derlich | 248/678 X |
| 4,638,971 | 1/1987 | Basinsky et al. | 248/678 |

FOREIGN PATENT DOCUMENTS

| 1038482 | 9/1958 | Fed. Rep. of Germany . |
| 8528471 | 1/1986 | Fed. Rep. of Germany . |
| 2301443 | 9/1976 | France . |
| 0627875 | 8/1949 | United Kingdom . |
| 0896733 | 5/1962 | United Kingdom . |
| 1024294 | 3/1966 | United Kingdom . |
| 2112922 | 7/1983 | United Kingdom . |

*Primary Examiner*—Ramon O. Ramirez
*Attorney, Agent, or Firm*—Young & Thompson

[57] ABSTRACT

The invention relates to a bed structure for supporting driving and driven units, such as internal combustion engines and generators for instance. The bed structure comprises a first frame section which serves as a transport frame and bed for the engine, and a second frame section which can be moved between a retracted transport position and an extended position in which it serves as a bed for an auxiliary unit, such as a generator.

12 Claims, 5 Drawing Sheets

BED STRUCTURE FOR SUPPORTING ENGINES AND AUXILIARY UNITS

The present invention relates to a bed structure intended for supporting driving and driven units, such as internal combustion engines and generators for example, and comprising first frame elements having support surfaces for supporting at least one such unit.

Stationary internal combustion engines intended for driving, e.g. generators, pumps, rotary machines, and like auxiliaries, are normally mounted on a supporting frame structure and then encased in large wooden crates for transportation from the manufacturer to the customer, e.g. to a manufacturer of generator units that are driven by an internal combustion engine. This manufacturer will then either dismantle the engine from the frame structure and fit the engine to his own engine and generator support bed, or alternatively will utilize the original frame structure as an engine support bed and mount the generator on a separate support bed which is aligned with and connected to the engine bed.

The packaging of engines on support frames in large wooden crates and the transportation of such crated assemblies are expensive for several reasons. Firstly the crates themselves are expensive and bulky, and secondly the material and work expended cannot be put to any purpose other than that associated purely with transportation, particularly when the transporting support frame is not subsequently used as the engine bed.

The object of the present invention is to provide a bed structure of the kind defined in the introduction which can be used as a supporting frame structure for transportation purposes, as an engine support bed, and as a bed for supporting an auxiliary unit, e.g. a generator, while at the same time eliminating the need to package the engine in a wooden crate.

This object is achieved in accordance with the invention in that second frame elements, which present support surfaces for supporting at least one further unit intended for connection to the first mentioned unit, are so connected to the first frame elements as to be adjustable to a transportation mode in which the greater part of said second frame elements is located within the extremities of the horizontal extension of the first frame elements, and to an operational mode in which said second frame elements form an extension of the first frame elements and that at least one of the frame elements present means with which the lifting tines of a fork-lift device are able to engage for the purpose of lifting the bed structure with a unit mounted thereon.

During the process of manufacture, an engine manufacturer is able to utilize the bed structure formed by the first frame elements as a support means in the assemblage of engines and auxiliary parts. Subsequent to this assemblage, the bed structure is used as a loading pallet, by engaging the tines of a fork-lift device directly with means provided herefor on the bed structure. This eliminates the need for separate loading pallets, crates or trestles. Since in the transportation mode of the bed structure the second frame elements are contained fully within the outer confines of the first frame elements, or extend from said first frame elements only to a slight extent, the whole assembly can be packaged in shrink film such as to provide a protective covering during transportation of the assembly to the customer. The customer need only extend the second frame elements to the extent dictated by the auxiliary unit to be supported, e.g. a generator, and to secure the first and second frame elements together, e.g. by welding or with the aid of bolts, whereafter the generator can be fitted on the bed and connected to the engine.

The invention will now be described with reference to exemplifying embodiments thereof illustrated in the accompanying drawings, in which FIG. 1 is a perspective view of a first embodiment of an inventive bed structure in a transportation mode;

Figure 1:
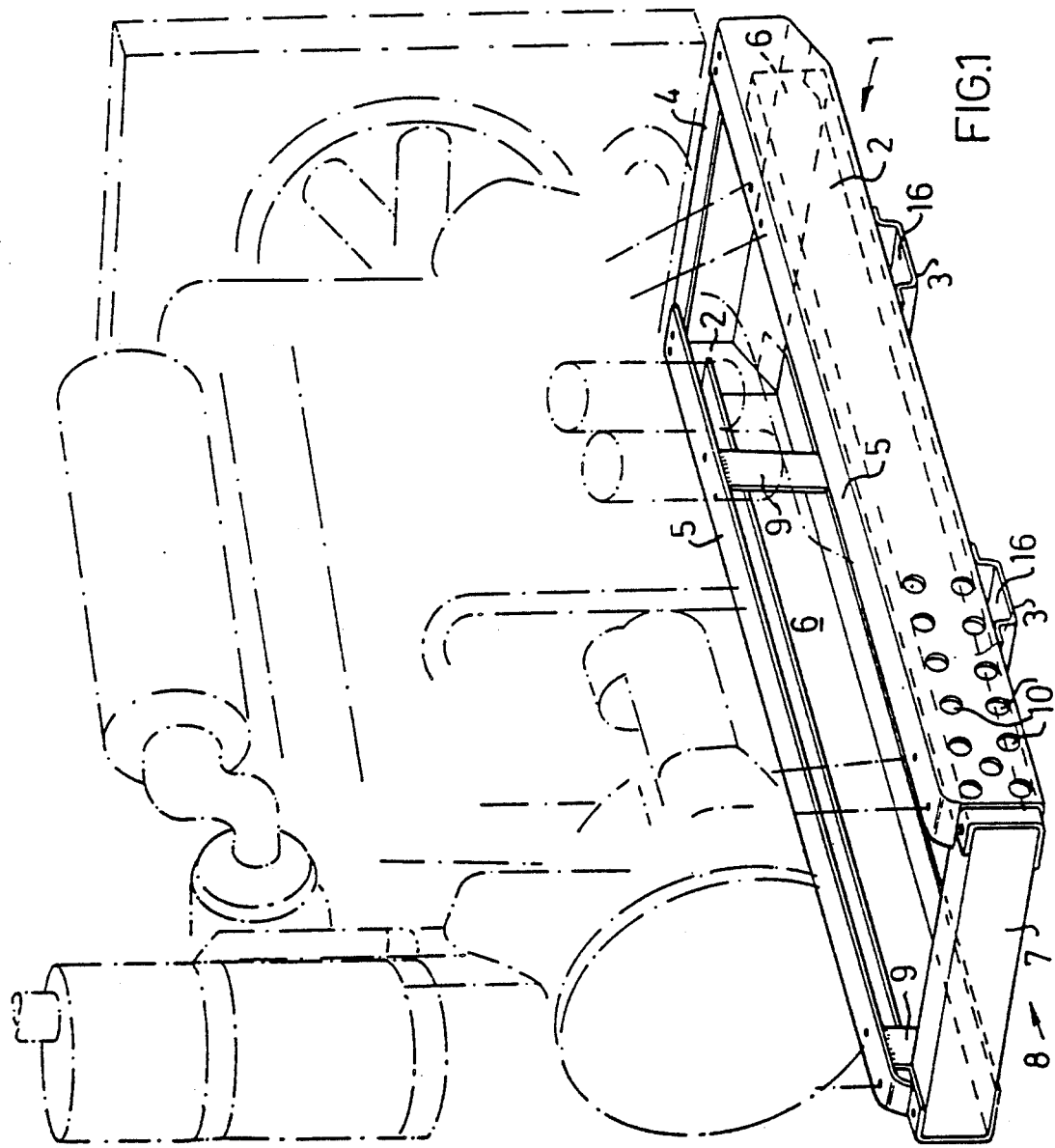

In FIG. 1 the reference numeral 1 identifies a frame structure which has firmly mounted thereon a diesel engine and a radiator, shown in chain lines. The frame structure 1 comprises a pair of U-beams 2 which extend in the direction of the longitudinal axis of the engine, a pair of transverse U-beams 3, and an end piece 4, all of which are welded or bolted together to form a rigid frame. The upper surface 5 of the U-beams 2 provides supports for the engine.

The U-beams 2 have inserted telescopically thereinto a pair of U-beams 6 (FIG. 1) which are joined together by means of an end piece 7 and which form a frame section, which is identified generally by reference numeral 8. The beams 6 are held against sideways movement by a pair of plates 9 attached to each beam 2.

Figure 2:
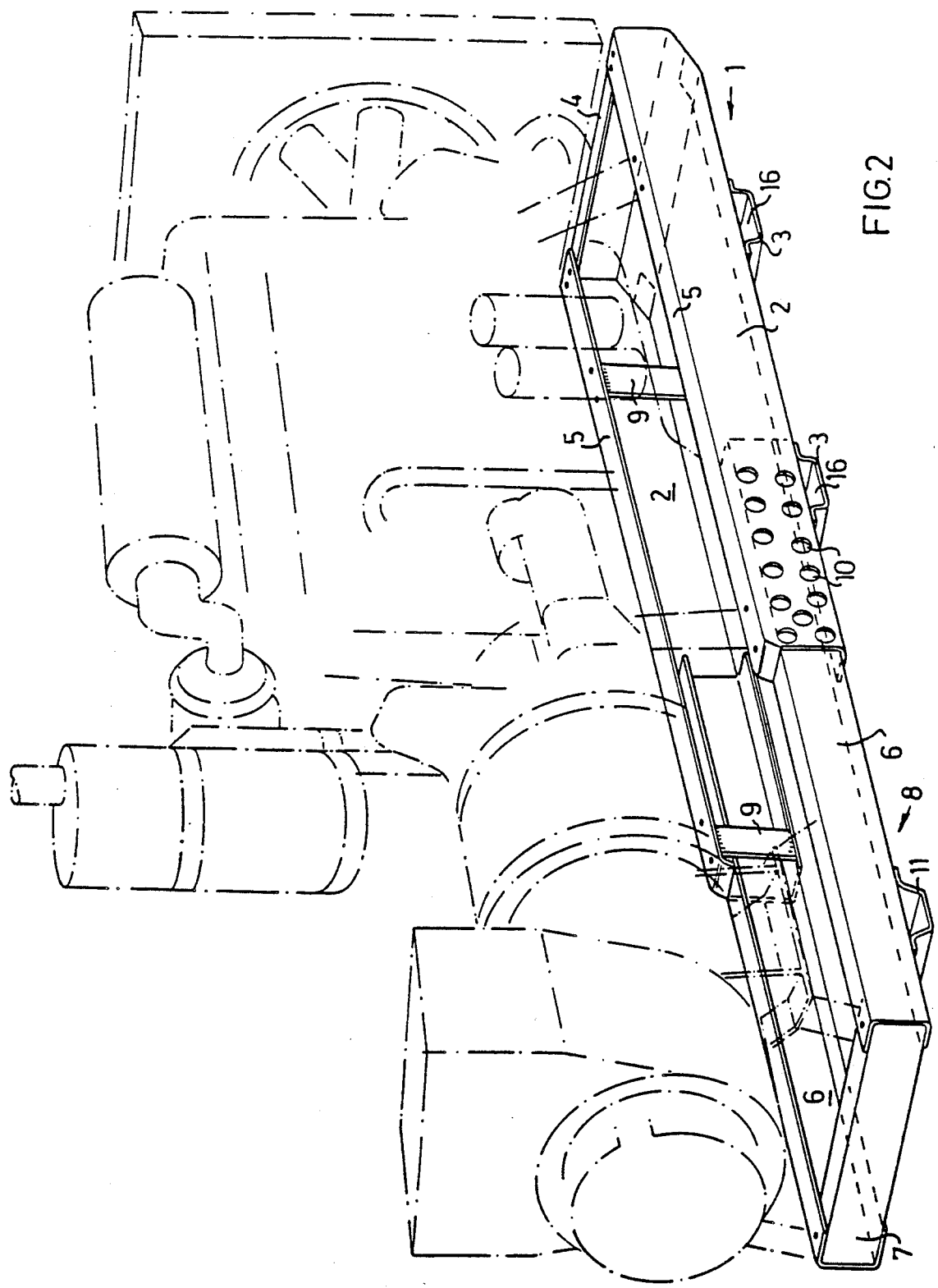
FIG. 2 shows the bed structure of FIG. 1 in an extended state.

In FIG. 2 the frame section 8 is shown extended somewhat from the frame section 1 such as to form a bed for an auxiliary unit, which in the illustrated embodiment has the form of a generator shown in chain lines. Subsequent to extending the frame section sufficiently to accommodate the auxiliary unit, the beams 6 are secured to the beams 2, for instance by drilling in the beams 6 holes which correspond to the holes 10 provided in the beams 2 and bolting or riveting the beams together, or alternatively by forming a weld in the holes 10. The embodiment of FIGS. 1 and 2 also incorporates a loose cross-beam 11 which is secured or welded firmly to the beams 6 subsequent to extending said beams from the pair of beams 2. When circumstances permit the beams 6 to project slightly from the beams 2 in the transport condition of the frame structure, the cross-beam 11 may be adjacent to or in the proximity of the outer ends of respective beams 6 prior to delivery of the engine assembly to the customer.

Figure 3:
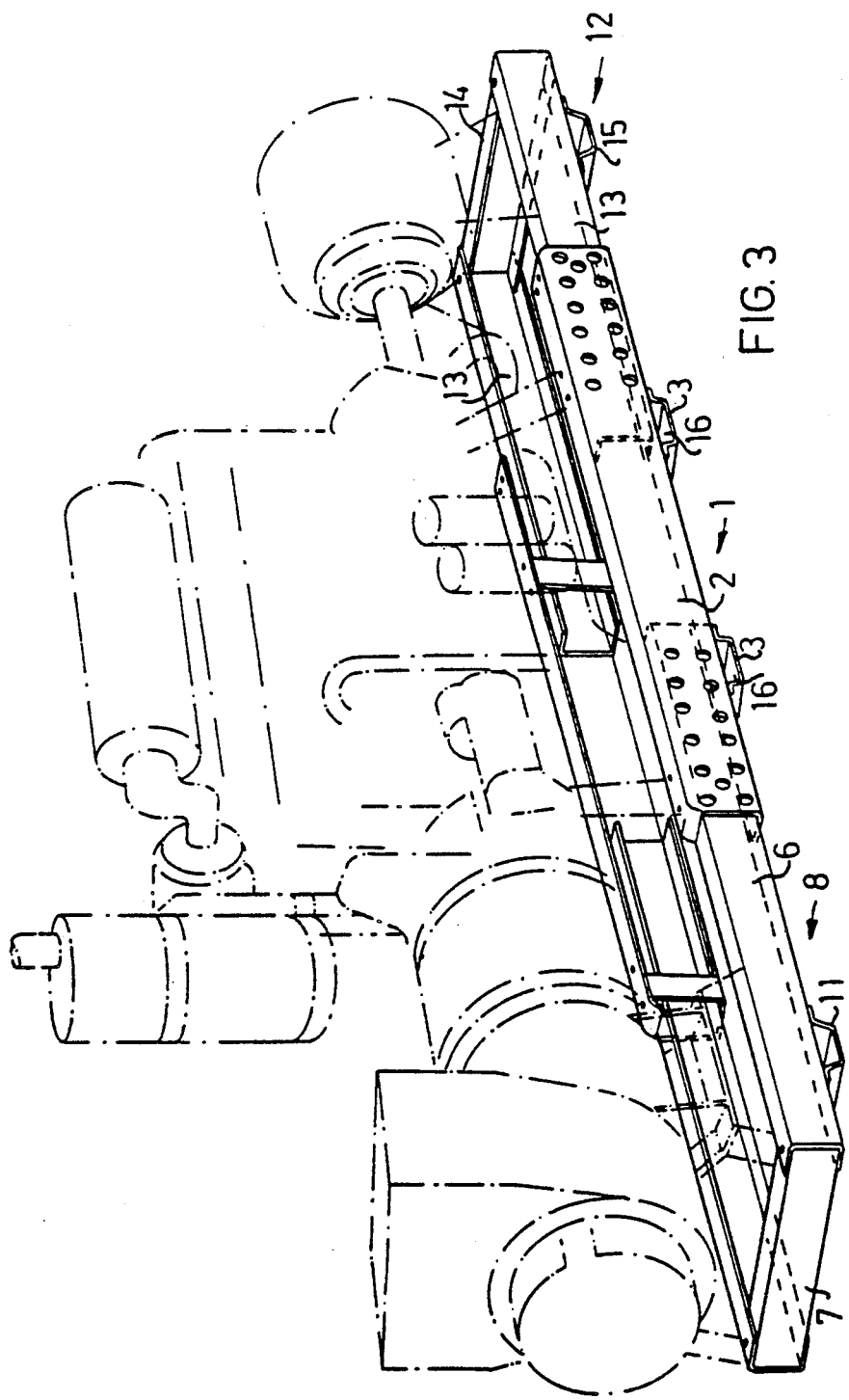
FIG. 3 is a perspective view of a second embodiment of a bed structure with said bed structure in an extended state.

FIG. 3 illustrates an embodiment of the inventive bed which includes, in addition to the frame sections 1 and 8, a third frame section 12. This third frame section corresponds to the frame section 8 and comprises a pair of beams 13 which extend in the direction of the longitudinal axis of the frame structure, an end piece 14 and a transverse beam 15. In the case of the illustrated embodiment, the inner ends of the beams 6 and 13 meet when the frame sections 8 and 12 are pushed into the beam pair 2 to their full extent, which means that their outer ends will project slightly from respective ends of the beams 2, unless the length of the frame section 1 is at least equal to the sum of the lengths of the frame sections 8 and 12.

If the frame section 1 is shorter than the total length of frame sections 8 and 12, either the frame section 8 or the frame section 12 may be made narrower than the other, such as to enable said sections to overlap one another in an inserted or retracted position, i.e. for instance such that the beams 13 can be moved axially within the U-beams 6. In the extended state illustrated in FIG. 3, the frame section 12 forms a bed for a hydraulic pump which is connected to a power take-off located on the front of the engine. This embodiment can also be used, for example, to support a centrally positioned generator which is driven directly from an engine located on one side thereof and which is supplied with "auxiliary power" from the other side thereof through the intermediary of a hydraulic coupling.

The transverse U-beams 3 of the frame section 1 are secured in spaced relationship to the beams 2 at a mutual distance apart which is adapted to the distance between the tines of a fork-lift truck. The open faces of respective beams 3 are turned towards the open faces of the beams 2, such as to form closed sleeve-like structures 16 for accommodating the lifting tines of said truck, therewith to afford a safe and reliable lifting arrangement.

Figure 4:
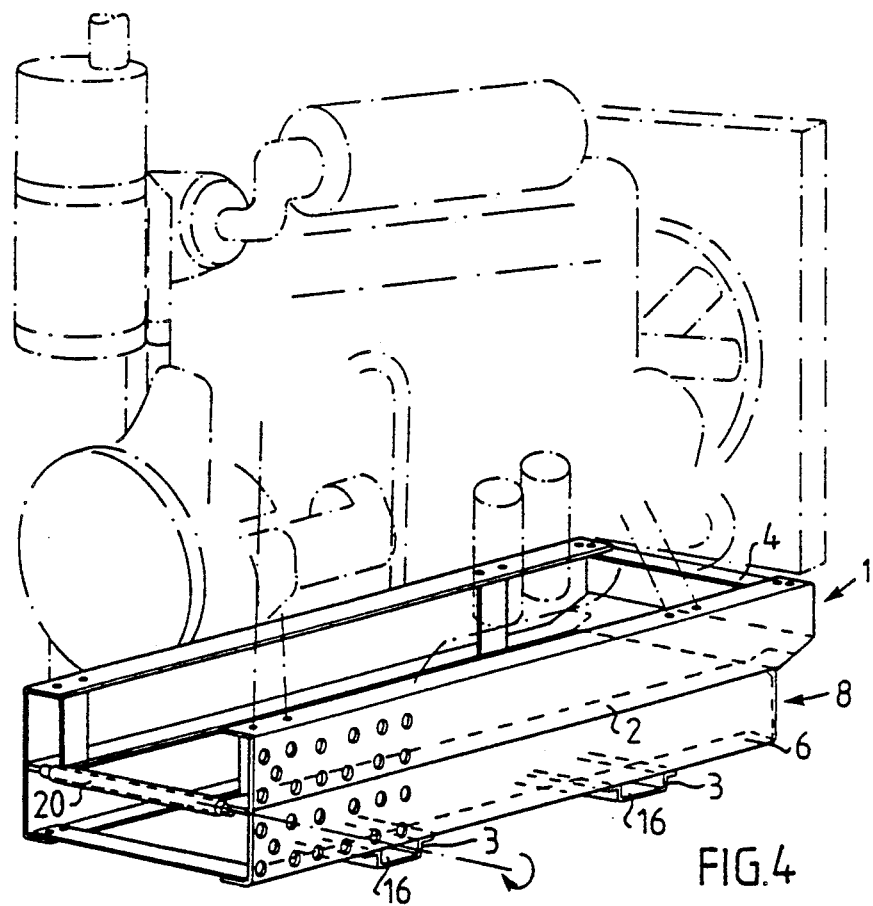
FIG. 4 is a perspective view of a third embodiment of a bed structure in a transportation mode.

FIG. 4 discloses an embodiment of the inventive bed similar to that shown in FIG. 1 but having the frame section 8 joined to the frame section 1 by hinge means 20. In the disclosed transportation mode the frame section 8 is folded down under the frame section 1. The U-beams 3, which form the sleeve structures 16 for the lifting tines of a truck, are therefore welded to the frame structure 8 instead of the frame 1.

Figure 5:
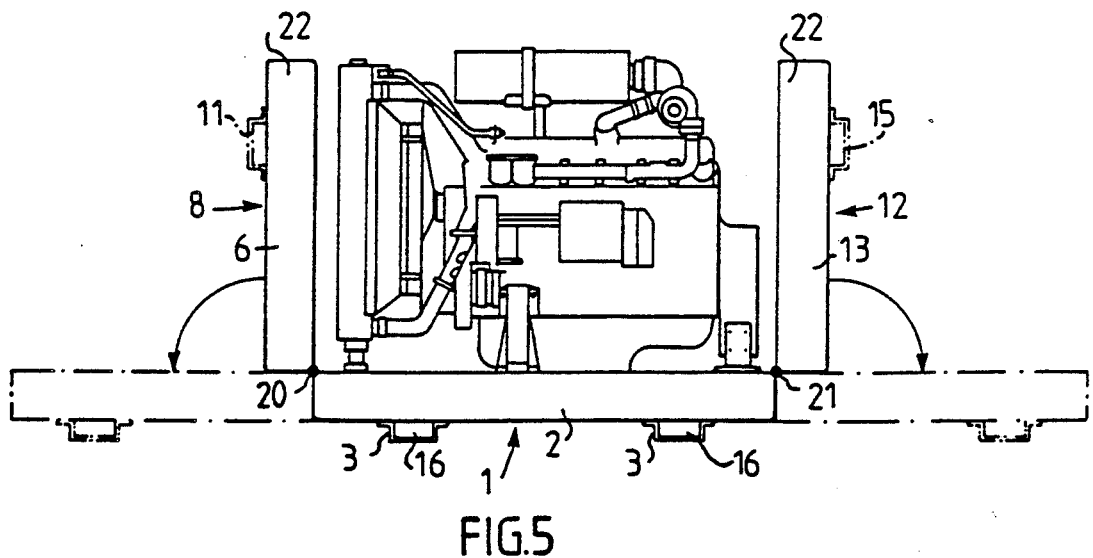
FIG. 5 is a perspective view of a fourth embodiment of a bed structure in a transportation mode.
Figure 6:
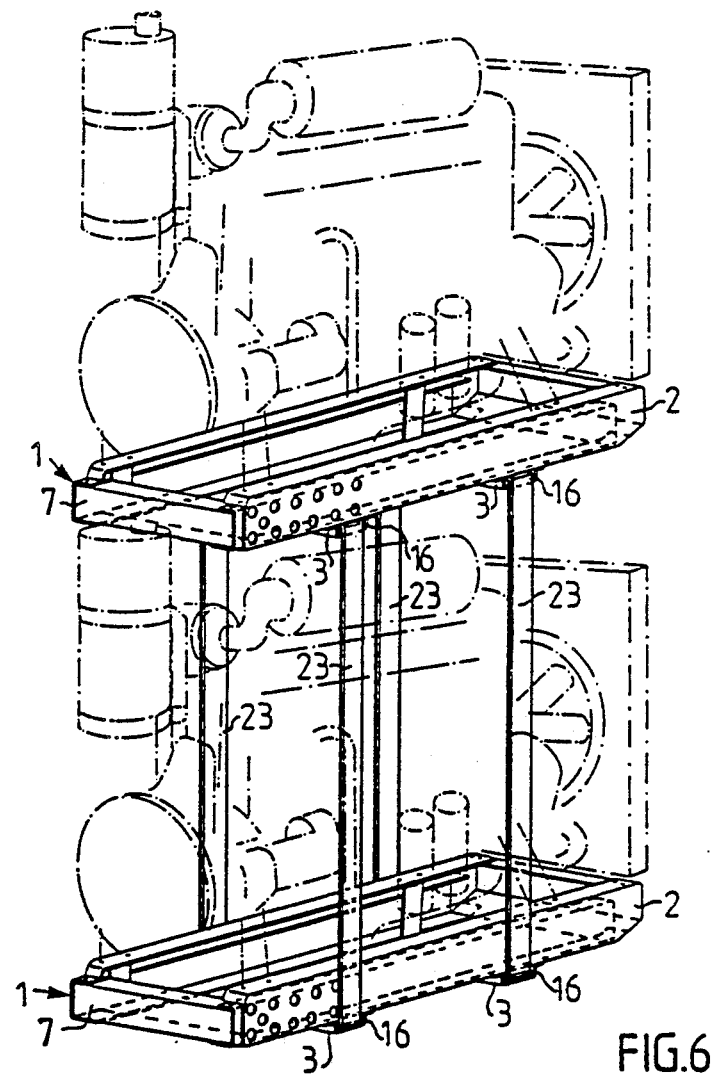
FIG. 6 is a perspective view of two bed structures interconnected by stack up means.

FIG. 5 discloses another embodiment of the inventive bed having hinge means 20 between the frame section 1 and the frame section 8. In addition, a third frame section 12 similar to that shown in FIG. 3 is joined to the frame section 1 by hinge means 21. In this embodiment the frame sections 8 and 12 are folded upwards to the transportation position, as shown with solid lines in FIG. 5. The extended working position is indicated with broken lines. The end surfaces 22 could be provided with means forming supports for other frame and engine assemblies so as to make it possible to stack frame and engine assemblies on top of one another similar to what is shown in FIG. 6. Means (not shown) are provided to lock the frame sections 8 and 12 in their upright position.

It will be appreciated that the frame assembly according to the invention may be utilized for other installations than stationary installations of the diesel power plan kind or like installations. For example, the frame assembly can be used for marine purposes, such as to enable a marine engine which is mounted for transportation on the frame assembly to be winched down into a small confined engine room, with the frame section 1 forming an engine bed or a part thereof. The frame assembly can then be extended in the aforedescribed manner, so that the frame section 8 and/or the frame section 12 form a support bed for hydraulic motors, reversing gear assemblies, etc.

The basic concept of the invention thus resides in the use of one and the same bed/frame assembly as a means for supporting an engine during its assembly, as a means for supporting the engine and at least as a part of the engine packaging material during transportation of the engine, and as a permanent means for supporting an engine and auxiliaries in the final installation thereof. The aforedescribed respective arrangements for enabling the frame assembly to be lifted by means of lifting forks and to enable the frame assembly to be extended are the minimum facilities required to this end. Other arrangements are also conceivable in addition hereto, in order to increase the versatility of the inventive bed structure. For example, the frame section 1 may be provided with attachment points (not shown) for a framework on which a protective covering, e.g. made of shrink plastic is fitted. Furthermore, the bed structure may be provided with devices (not shown) which can be adapted to the transport arrangements provided on the actual assembly or construction line concerned. In addition, a stackable system devoid of shelves can be created (FIG. 6) with the aid of cramp-like bracing struts 23 inserted into the respective sleeves 16 of the frame assembly of an overlying engine and an underlying frame assembly with engine.

Although the invention has been described with reference to frame assembly embodiments which can be extended in the direction of the longitudinal axis of the engine, it will be understood that the invention also includes embodiments, not shown, in which the bed/frame assembly can be extended in a direction other than in the direction of the longitudinal axis of the unit carried thereby, e.g. such as to accommodate laterally located belt-driven or gear-driven auxiliary units.

I claim:

1. A combustion engine support bed comprising first frame elements having support surfaces adapted to support a combustion engine and second frame elements having support surfaces adapted to support a separate auxiliary unit to be connected to the engine, said second frame elements being connected to the first frame elements so as to be adjustable to a transporting mode of the support bed, at least the major part of said second frame elements being located within the confines of the horizontal extensions of the respective first frame elements in said transporting mode of the support bed, and also such as to be adjustable to an operational mode of said support bed, in which said second frame elements form an extension of the first frame elements, at least one of the frame elements having means defining plural spaced openings within which the tines of a fork-lift device can be inserted for the purpose of lifting the bed with a unit mounted thereon, and ground-engaging means mounted on and extending below said second frame elements to support said second frame elements on the ground.

2. A support bed according to claim 1, characterized in that the first frame elements include beams which extend in the direction of the longitudinal axes of said units; and in that the second frame elements include beams which are displaceable in relation to the first mentioned beams in the direction of their longitudinal axes between a transporting position or mode and an operational position or mode.

3. A support bed according to claim 2, characterized in that said means defining plural spaced openings comprise one pair of mutually spaced transverse beams which form sleeves for accommodating the tines of a fork-lift device and by which the beams of the first frame elements are connected together.

4. A support bed according to claim 2 characterized in that the beams of the first frame elements are constructed for telescopic journalling of the beams of the second frame elements.

5. A support bed according to claim 2 characterized in that the first frame element and the second frame element are interconnected by hinge means.

6. A support bed according to claim 1, characterized in that third frame elements for supporting at least one further auxiliary unit are connected to the first frame elements such as to be adjustable to a transporting mode of the bed structure, in which mode at least the major part of said third frame elements lie within the confines of the horizontal extensions of respective first frame elements, and to an operational mode of said bed structure in which said third frame elements form an axial extension of the first frame elements in the direction of the longitudinal axes of the respective units on the opposite side to the second frame elements.

7. A support bed according to claim 1 characterized by cramp-like bracing struts which are insertable into sleeves of the frame assembly of an overlying engine and the frame assembly of an underlying engine.

8. A bed support according to claim 1, characterized in that said ground-engaging means extend between and interconnect opposite sides of said second frame elements.

9. A support bed according to claim 8, characterized in that said ground-engaging means comprise a hollow horizontal beam secured to the underside of said second frame elements.

10. A combustion engine support bed comprising first frame elements having support surfaces adapted to support a combustion engine and second frame elements having support surfaces adapted to support a separate auxiliary unit to be connected to the engine, said second frame elements being connected to the first frame elements so as to be adjustable to a transporting mode of the support bed, at least the major part of said second frame elements being located within the confines of the horizontal extensions of the respective first frame elements in said transporting mode of the support bed, and also such as to be adjustable to an operational mode of said support bed, said second frame elements forming an extension of the first frame elements, at least one of the frame elements having means defining plural spaced openings within which the tines of a fork-lift device can be inserted for the purpose of lifting the bed with a unit mounted thereon; means for fixedly securing together said first and second frame elements against lengthwise movement relative to each other; and ground-engaging means mounted on and extending below said second frame elements to support said second frame elements on the ground.

11. The support bed according to claim 10, in which said fixing means comprise welds.

12. A support bed according to claim 11, characterized in that said first frame elements have holes therethrough and said welds are disposed in said holes.

* * * * *